No. 728,908. PATENTED MAY 26, 1903.
F. D. GROSS.
MEANS FOR TREATING ORES.
APPLICATION FILED OCT. 9, 1902.
NO MODEL. 5 SHEETS—SHEET 1.

Fig. 1.

WITNESSES:
M. B. Cutshaw
S. M. Neff

Frederick D. Gross
INVENTOR.

No. 728,908. PATENTED MAY 26, 1903.
F. D. GROSS.
MEANS FOR TREATING ORES.
APPLICATION FILED OCT. 9, 1902.
NO MODEL. 5 SHEETS—SHEET 4.

WITNESSES:

INVENTOR

No. 728,908. PATENTED MAY 26, 1903.
F. D. GROSS.
MEANS FOR TREATING ORES.
APPLICATION FILED OCT. 9, 1902.
NO MODEL. 5 SHEETS—SHEET 5.

WITNESSES:
M. B. Cutshaw
N. V. Fitts

Frederick D. Gross
INVENTOR.

No. 728,908. Patented May 26, 1903.

UNITED STATES PATENT OFFICE.

FREDERICK D. GROSS, OF DENVER, COLORADO, ASSIGNOR OF TWO-THIRDS TO TIMOTHY GOODWIN AND THE COLORADO IRON WORKS COMPANY, OF DENVER, COLORADO, A CORPORATION OF COLORADO.

MEANS FOR TREATING ORES.

SPECIFICATION forming part of Letters Patent No. 728,908, dated May 26, 1903.

Application filed October 9, 1902. Serial No. 126,384. (No model.)

*To all whom it may concern:*

Be it known that I, FREDERICK D. GROSS, a citizen of the United States, and a resident of Denver, county of Arapahoe, and State of Colorado, have invented a new and useful Improvement in Means for Treating Ores, of which the following is a specification, the principle of the invention being herein explained and the best mode in which I have contemplated applying that principle, so as to distinguish it from other inventions.

My invention relates to devices for treating ores, and particularly to devices for roasting gold, silver, and lead ores in which such ore is agitated or rabbled to expose different portions of its surface to the action of the heat used in such roasting operation.

The object of such invention is to effect such ore manipulation in a more economical manner than has heretofore, in so far as I am aware, been the practice.

Said invention consists of means hereinafter fully described, and particularly set forth in the claims.

The annexed drawings and the following description set forth in detail certain mechanism embodying the invention, such disclosed means constituting but one of various mechanical forms in which the principle of the invention may be used.

In said annexed drawings.

Figure 5:
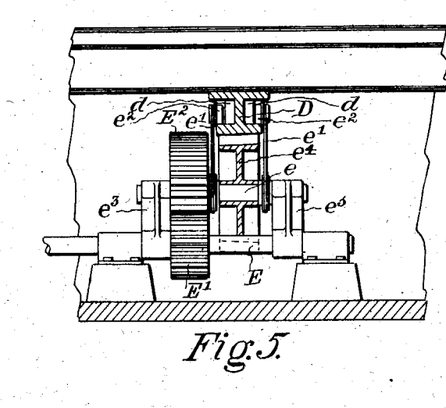
Figs. 5 and 6 represent enlarged detail front and side elevations of driving mechanism for revolving the hearth.
Figure 6:
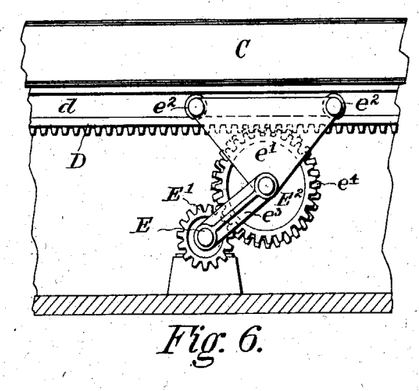
Figures 7, 8:
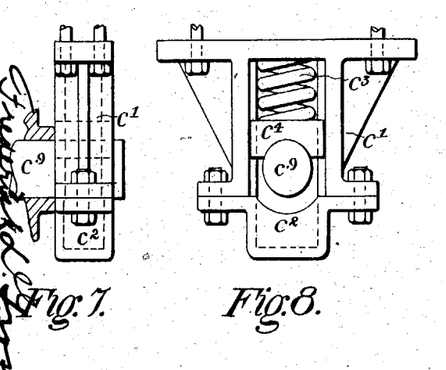
Figs. 7 and 8 represent enlarged detail side and front elevations of the hangers carrying the bearings for the wheels and forming the supports for the hearth.

In the device illustrated as embodying my invention, A is a brickwork arched structure forming the top and sides of an annular ore-roasting chamber A'. Beneath this structure is a circular track B, upon which travels an annular hearth C, forming the bottom of the roasting-chamber and movable in the annular structure A. This hearth rests upon I-beams $c$, which in turn are supported upon jaws $c'$, each forming a vertical slideway for a slidable member $c^4$ of a bearing-box $c^2$ for the axles $c^9$ for the wheels $c^{10}$, Figs. 6, 7, and 8. A helical spring $c^3$ is interposed between each member $c^4$ and the top of the slideway intermediate of the two jaw members, as shown, these springs receiving and distributing the vibrations which result when the hearth is moved and at same time to take up any inequalities in the hearth. A circular rack D is secured to the under surface of the hearth, Figs. 2, 5, and 6. A driving-shaft E is mounted in suitable bearings secured to a suitable stationary foundation and has secured thereto, Fig. 5, a driving-pinion E'. This driving-pinion meshes with a gear $E^2$ and is mounted upon a shaft $e$, secured in two hanger-plates $e'$ $e'$. Pinion-wheel $e^4$, also mounted upon a shaft $e$, meshes with rack D. The hanger-plates $e'$ $e'$ are hung upon rollers. These plates are hung upon rollers $e^2$ $e^2$, which run in two grooves $d$ $d$, formed upon the sides of the rack D, as shown in said Fig. 5. The rod $e$ is tied to the shaft E by means of two links $e^8$ $e^8$, these links $e^8$ $e^8$ forming connection between the two shafts E and $e$, point of fulcrum being in shaft E, object being to at all times maintain mesh between pinion $e^4$ and rack D in case of any inequality in rack D and grooves $d\ d$. Suitable means, as an electric motor D' and controlling means therefor, are provided for variably driving the shaft E at the required speed. It is thus seen that by driving-shaft E the hearth may be revolved and ore carried thereby transported through the roasting-chamber. Two such driving means may be, as shown, employed.

Figure 2:
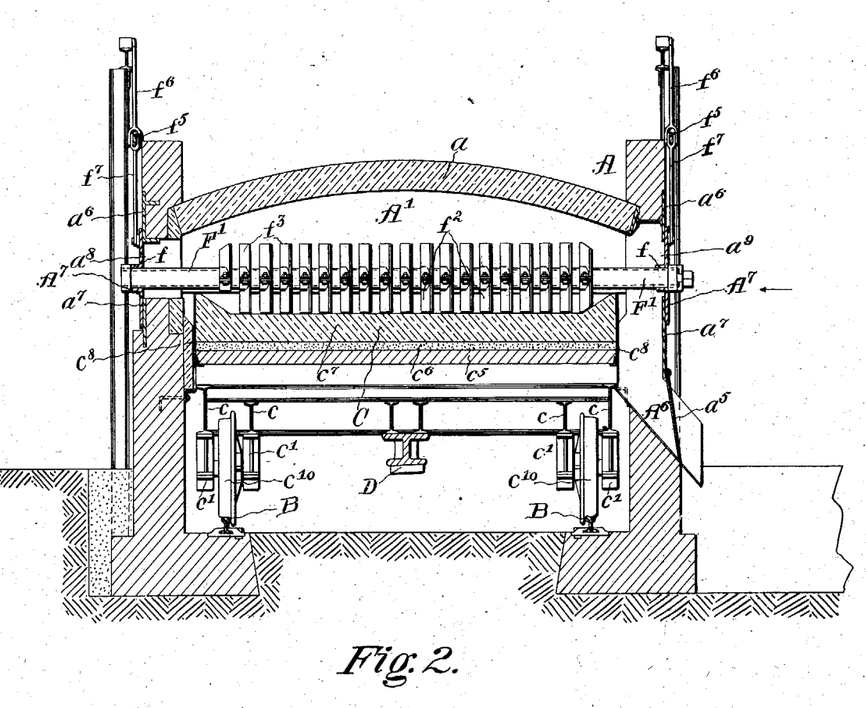
Fig. 2 represents a vertical transverse section, on an enlarged scale, taken upon the plane indicated by line $x$ $x$, Fig. 1.
Figure 4:
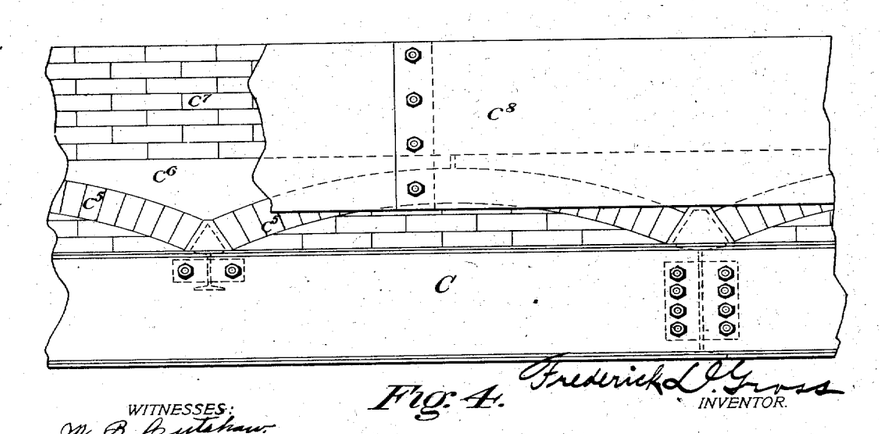
Fig. 4 represents, upon an enlarged scale, a side elevation of a part of the movable hearth used in my invention, showing a part of the side plates broken away.
Figure 11:
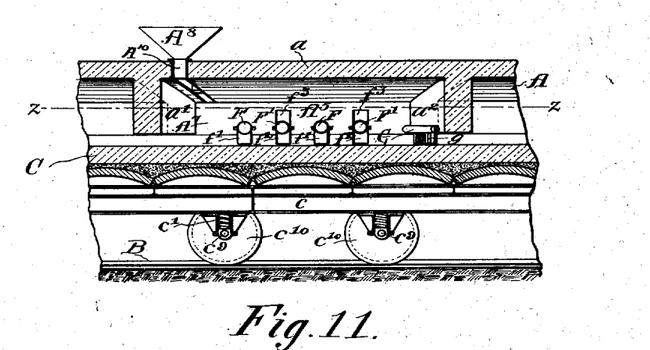
Fig. 11 represents, upon an enlarged scale, a vertical section of a portion of the roasting-chamber structure and hearth, taken upon the plane indicated by the line $y$ $y$, Fig. 1, the chamber where rabbling and discharging of the ore takes place.

Any suitable construction of hearth-bed may be employed; but the form illustrated in Figs. 2, 4, and 11 I have found preferable. In said form brick arches $c^5$ rest upon the I-beams $c$, and a leveling-layer of cement $c^6$ is superimposed. Upon the cement is laid fireproof material $c^7$, suitable for forming the upper hearth-surface. Side plates $c^8$ are secured to the sides of the hearth to protect and strengthen its structure.

At intervals around the inner and outer peripheries of the structure A are placed a number of fire-boxes $A^2$, each of which is connected, by means of a suitable flue, with the roasting-chamber and which together furnish heat to the interior of such chamber for properly roasting the ores. A flue $A^3$ connects such chamber with a suitable stack $A^4$.

Figure 3:
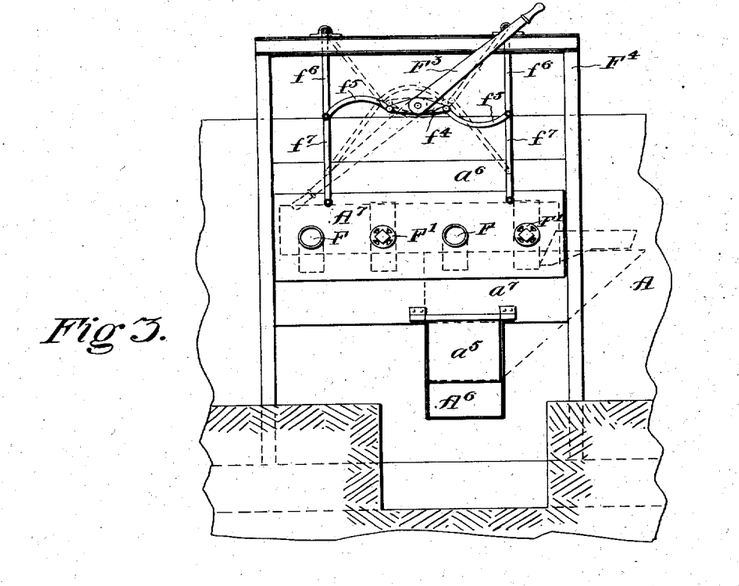
Fig. 3 represents a side elevation of a portion of the outside of the furnace looking in the direction indicated by the arrow in Fig. 2.
Figure 9:
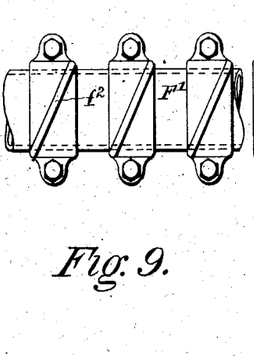
Figs. 9 and 10 represent, upon an enlarged scale, a bottom plan view and end elevation of a section of a rabbling arm and blade used in my said invention.
Figure 10:
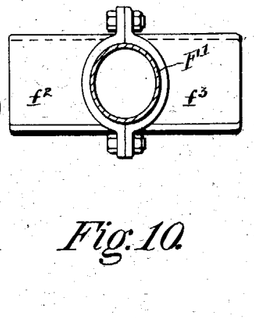
Figure 12:
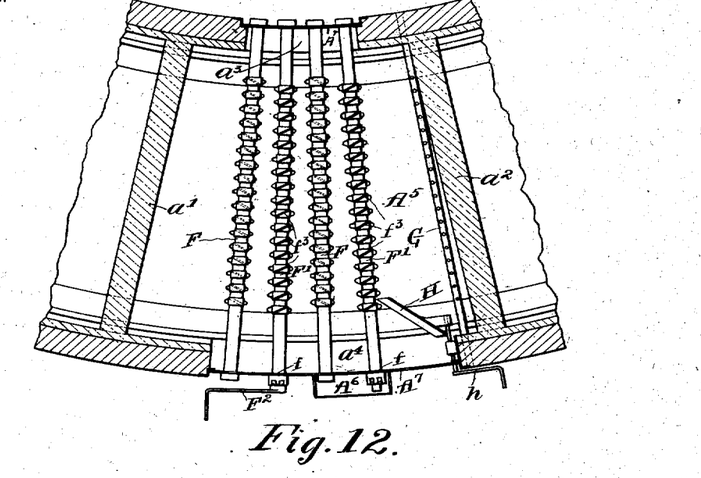
Fig. 12 represents a horizontal section of Fig. 11, taken upon the plane indicated by the line $z$ $z$, Fig. 11.

At a point preferably opposite the flue $A^3$, forming an integral part of and depending from the arched cover or top $a$ of the roasting-chamber, are two diaphragms or walls $a'$ and $a^2$, which form a separate chamber $A^5$, to which I shall hereinafter refer as the "rabbling-chamber." These diaphragms depend to within a distance from the hearth such as to permit the ore to pass therebeneath, said distance being, however, such as to prevent any considerable amount of dust or other aeriform matter which might be generated therein to pass into the roasting-chamber. Two lateral openings $a^3$ and $a^4$ are formed in the walls of structure A and communicate with the interior of the rabbling-chamber, as shown in Fig. 12. These openings are covered, as will be hereinafter described. Opening $a^4$ communicates with a discharging-chute $A^6$, whose exit-opening is controlled by a door or valve $a^5$, Figs. 2, 3, and 12. Directly opposite said openings, upon the exterior of the side walls of structure A, are secured top and bottom plates $a^6$ and $a^7$, forming enlarged slots $a^8$ and $a^9$, respectively. These slots are covered with vertically-sliding plates $A^7$, which are operated to move upwardly or downwardly by a suitable lever system, operated, preferably, by hand, as illustrated in Fig. 3 and as will be further described. In these plates are secured the ends of a number of rods F and F', passing transversely through the rabbling-chamber. In the illustrated device there are four such rods, two rods F and two rods F'. Of the whole number of rods a part, the two rods F', as shown, are made rotatable in bearings $f$, formed in the plates $A^7$, Fig. 2, the outer ends being squared, so as to permit of their rotation by means of a suitable crank $F^2$, Fig. 12. Intermediate of the ends of rods F are secured a plurality of downwardly-extending rabbling-blades $f'$, all inclined in like directions relatively to the direction of travel of the hearth. The rotatable rods F' are similarly provided with downwardly-extending rabble-blades $f^2$, inclined, however, in a direction opposite to that of the inclination of blades $f'$, as shown in Fig. 12, Fig. 10, together with Fig. 9, illustrating the preferred form of construction of these blades and the method of securing same to the rods F'. The opposite sides of rods F' are provided with a series of discharging-blades $f^3$, inclined when in their illustrated upwardly-extending position in a direction similar to that of the inclination of blades $f^2$, Fig. 10. It is hence apparent from the above-described construction that by rotating the rods F' through an angle of one hundred and eighty degrees all of the downwardly-extending blades $f'\ f^3$ will incline in similar directions, thereby effecting a result hereinafter explained. Referring to the direction of rotation as that indicated by the arrow, Fig. 1, in the farther side of the rabbling-chamber is placed a transverse rod G, having a plurality of downwardly-extending fingers or pins $g$. On the same side of the chamber with said rod G and in proximity to the opening $a^4$ is an inclined shovel or plow H, movable up and down, and hence into and out of the path of the ore, by means of a crank-arm $h$ upon the outside of the structure A, Fig. 12. This shovel is adapted to divert any ore coming into contact therewith into and through opening $a^4$ and into the chute $A^6$.

As illustrated, a separate lever system is provided for operating each plate $A^7$. Each such system consists of a hand-lever $F^3$, suitably journaled upon the top of the structure and having a double rocker-arm $f^4$ fixedly connected therewith, two links $f^5$, each having one end articulating with the ends of two rods $f^6$ and $f^7$. Rods $f^6$ are pivoted at their upper ends upon a fixed frame $F^4$, and the lower ends of rods $f^7$ are attached to the plate $A^7$. It is thus seen that by swinging the hand-levers the plates may be raised or lowered, as desired.

Figure 1:
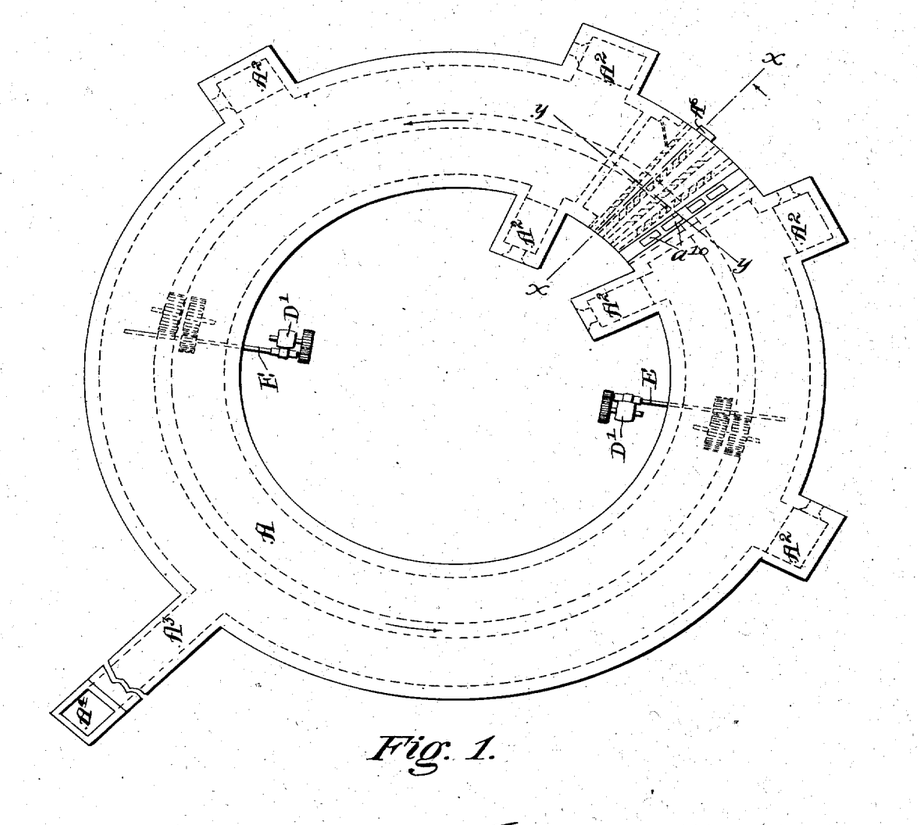
Figure 1 represents a top plan view of a roasting-furnace embodying my invention.

Suitable openings $A^{10}$ and a hopper $A^8$, Fig. 11, are provided in the top of the structure A, Figs. 1 and 11, for feeding ore into the rabbling-chamber.

In operating the above-described device the hearth is revolved, the rabbling-blades set as illustrated in Fig. 12, and ore is fed into the rabbling-chamber, and thus carried successively through the roasting and rabbling chambers. In passing through the latter the rabbling-blades agitate the ore, exposing previously-unexposed surfaces to the heat on subsequently passing through the roasting-chamber. Any gold-bearing or otherwise valuable dust which is raised during such agitation is prevented from finding exit through the flue $A^3$ and stack $A^4$ by the depending walls $a'$ and $a^2$, and a considerable saving of precious metal is thus effected by the use of such inclosed and separated rabbling-chamber. The pins $g$ upon the rod $G$ break up the rows of ore formed by the last set of rabbling-blades, and so distribute the ore more evenly upon the hearth. When it is desired to discharge the ore from the hearth, rods $F'$ are turned, so as to substitute blades $f^3$ for blades $f^2$, thus causing all the blades to be of the same inclination. The ore now coming into contact with these similarly-inclined blades is gradually moved over toward opening $a^4$ and finally discharged through same, plow $H$ assisting in this operation. When it is desired to subject the exposed surface of the ore to the heat of the roasting-chamber a length of time greater than would be afforded by one complete revolution of the hearth, the plates $A^7$ are raised by means of the levers and the rabble-blades so removed from the path of the ore, whereby further rabbling is avoided.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In means for treating ores, the combination of means for carrying ore, a series of rabbling-blades inclined relatively to the path of ore movement, a portion thereof being of inclination opposite that of the remainder, and means for replacing blades of similar inclination with blades of opposite inclination whereby all blades in the ore-path may be of same inclination.

2. In means of treating ores, a series of rods carrying rabbling-blades on one side inclined relatively to the rods' axes and in similar directions, one such rod being rotatable and provided with inclined blades disposed on the opposite side of such rod and having a direction of inclination similar to that of first-named blades upon the same rod.

3. In means for treating ores, the combination of means for carrying ore, independent means in the path of such ore for rabbling and discharging same, and means for simultaneously removing such rabbling and discharging means from the path of such ore.

4. In means for treating ores, the combination of means for carrying ore, a series of rods carrying rabbling-blades inclined relatively to the path of movement of such ore, part of such rods being fixed, and the remainder being rotatable, such rotatable rods being provided with blades on both sides inclined in the same direction, means for causing the blades on one side of such rotatable rods to work in opposition to the blades of the fixed rods to rabble the ore, and means for causing the blades on the other side of such rotatable rods to work in concurrence with the blades of the fixed rods to discharge the ore.

5. In means for treating ores, the combination of means for carrying ore, a series of rods carrying rabbling-blades inclined relatively to the path of movement of such ore, part of such rods being fixed, and the remainder being rotatable, such rotatable rods being provided with blades on both sides inclined in the same direction, means for causing the blades on one side of such rotatable rods to work in opposition to the blades of the fixed rods to rabble the ore, means for causing the blades on the other side of such rotatable rods to work in concurrence with the blades of the fixed rods to discharge the ore, and means for simultaneously removing such rabbling and discharging means from the path of such ore.

6. In means for treating ores, a furnace having a roasting-chamber provided with a lateral discharge-opening, an annular hearth movable relatively to such chamber, means for revolving such hearth, and means inclined to the path of movement of the ore and adapted to work in opposition to rabble the ore, or, in concurrence, to discharge the ore through such opening.

7. In means for treating ores, a furnace having a roasting-chamber provided with a lateral discharge-opening, a separate covered rabbling-chamber, an annular hearth movable relatively to such chambers, means for revolving such hearth, and means inclined to the path of movement of the ore and adapted to work in opposition to rabble the ore, or, in concurrence, to discharge the ore through such opening.

8. In means for treating ores, a furnace having a roasting-chamber provided with a lateral discharge-opening, a separate covered rabbling-chamber, an annular hearth movable relatively to such chambers, means for revolving such hearth, means inclined to the path of movement of the ore and adapted to work in opposition to rabble the ore, or, in concurrence, to discharge the ore through such opening, and means for simultaneously removing such rabbling and discharging means from the path of such ore.

9. In means for treating ores, a furnace having a roasting-chamber provided with a lateral discharge-opening, a separate covered rabbling-chamber, an annular hearth movable relatively to such chambers, means for revolving such hearth, a series of rods carrying rabbling-blades inclined relatively to the path of movement of such ore, part of such rods being fixed, and the remainder being rotatable, such rotatable rods being provided with blades on both sides inclined in the same direction, means for causing the blades on one side of such rotatable rods to work in opposition to the blades of the fixed rods to rabble the ore, means for causing the blades on the other side of the rotatable rods to work in concurrence with the blades of the fixed rods to discharge the ore through the said discharge-opening, and means for simultaneously removing such rabbling and discharging means from the path of such ore.

Signed by me this 30th day of September, 1902.

FREDERICK D. GROSS.

Witnesses:
M. B. CUTSHAW,
N. V. FITTS.

---

Correction in Letters Patent No. 728,908.

It is hereby certified that Letters Patent No. 728,908, granted May 26, 1903, upon the application of Frederick D. Gross, of Denver, Colorado, for an improvement in "Means for Treating Ores," was erroneously issued to Frederick D. Gross, Timothy Goodwin, and The Colorado Iron Works Company, as joint owners of said invention; whereas the patent should have been granted to said *Frederick D. Gross* and *The Colorado Iron Works Company*, they being sole owners of the entire interest as shown by the assignments of record in the Patent Office; and that the said Letters Patent should be read with this correction therein that the same may conform to the record of the case in the Patent Office.

Signed and sealed this 30th day of June, A. D., 1903.

[SEAL.]

E. B. MOORE,
*Acting Commissioner of Patents.* with blades on both sides inclined in the same direction, means for causing the blades on one side of such rotatable rods to work in opposition to the blades of the fixed rods to rabble the ore, means for causing the blades on the other side of the rotatable rods to work in concurrence with the blades of the fixed rods to discharge the ore through the said discharge-opening, and means for simultaneously removing such rabbling and discharging means from the path of such ore.

Signed by me this 30th day of September, 1902.

FREDERICK D. GROSS.

Witnesses:
M. B. CUTSHAW,
N. V. FITTS.

---

It is hereby certified that Letters Patent No. 728,908, granted May 26, 1903, upon the application of Frederick D. Gross, of Denver, Colorado, for an improvement in "Means for Treating Ores," was erroneously issued to Frederick D. Gross, Timothy Goodwin, and The Colorado Iron Works Company, as joint owners of said invention; whereas the patent should have been granted to said *Frederick D. Gross* and *The Colorado Iron Works Company*, they being sole owners of the entire interest as shown by the assignments of record in the Patent Office; and that the said Letters Patent should be read with this correction therein that the same may conform to the record of the case in the Patent Office.

Signed and sealed this 30th day of June, A. D., 1903.

[SEAL.]

E. B. MOORE,
*Acting Commissioner of Patents.*

It is hereby certified that Letters Patent No. 728,908, granted May 26, 1903, upon the application of Frederick D. Gross, of Denver, Colorado, for an improvement in "Means for Treating Ores," was erroneously issued to Frederick D. Gross, Timothy Goodwin, and The Colorado Iron Works Company, as joint owners of said invention; whereas the patent should have been granted to said *Frederick D. Gross* and *The Colorado Iron Works Company*, they being sole owners of the entire interest as shown by the assignments of record in the Patent Office; and that the said Letters Patent should be read with this correction therein that the same may conform to the record of the case in the Patent Office.

Signed and sealed this 30th day of June, A. D., 1903.

[SEAL.]

E. B. MOORE,
*Acting Commissioner of Patents.*